United States Patent [19]

Morikawa et al.

[11] Patent Number: 5,267,105
[45] Date of Patent: Nov. 30, 1993

[54] DISK LOADING DEVICE

[75] Inventors: Matsuo Morikawa; Tokuya Kaneda, both of Odawara, Japan

[73] Assignee: Hitachi, Ltd., Tokyo, Japan

[21] Appl. No.: 753,846

[22] Filed: Sep. 3, 1991

[30] Foreign Application Priority Data

Sep. 3, 1990 [JP] Japan .................................. 2-230555

[51] Int. Cl.⁵ .............................................. G11B 17/04
[52] U.S. Cl. ................... 360/99.06; 360/99.02; 360/98.07; 369/75.2
[58] Field of Search ................ 369/75.2; 360/98.07, 360/99.07, 99.06, 99.02, 99.05, 99.12, 98.08

[56] References Cited

U.S. PATENT DOCUMENTS 5,123,005  6/1992  Karosu ............................ 360/99.02

FOREIGN PATENT DOCUMENTS

62-8362  1/1987  Japan .

Primary Examiner—Paul M. Dzierzynski
Assistant Examiner—Don Wong
Attorney, Agent, or Firm—Fay, Sharpe, Beall, Fagan, Minnich & McKee

[57] ABSTRACT

A disk apparatus includes a disk holder for holding a disk, and the disk holder is reciprocatively movable between a loading position and an unloading position. The disk apparatus further includes a motor for driving the disk at the loading position for reading or writing purposes, a power transmission mechanism for converting the rotation of the shaft of the motor into a reciprocative motion and for transmitting the reciprocative motion to the disk holder, and a switching mechanism for switching the power transmission mechanism to an inoperative state so as to prevent the power of the motor from being transmitted from the motor to the disk holder when the motor is operating to rotate the disk for reading or writing purposes.

14 Claims, 10 Drawing Sheets

POSITION III
POSITION I
POSITION II

DISK LOADING DEVICE

BACKGROUND OF THE INVENTION

1. FIELD OF THE INVENTION

The present invention relates to a reading/writing apparatus of the type which uses a disk as an information recording medium and, more particularly, to a disk loading device for loading and unloading the reading/writing apparatus with a cartridge containing a disk.

2. DESCRIPTION OF THE PRIOR ART

A known disk loading device disclosed in Japanese Patent Unexamined Publication (Kokai) No. 62-8362 employs a loading motor which is used exclusively for loading and unloading purposes. In operation, a tray carrying a cartridge accommodating a disk-type recording medium is moved to a predetermined position, and the loading motor is started to drive a pulley through operations of gears and shafts so that a belt wound on the pulley is made to run, thereby causing a holding member fixed to the belt to move along guide rails. A slide member connected to the holding member and a clamp member secured to the slide member are moved together with the tray as a result of the movement of the holding member. Pins which are provided on the slide member engage with S-shaped slots formed in side walls of the tray so as to slide along these slots from lower horizontal portions to upper horizontal portions of these slots in accordance with the movement of the slide member, whereby the tray and the clamp member are moved also in a direction perpendicular to the direction of the sliding movement of the slide member.

Other commercially available disk loading apparatus also employ motors which are exclusively used for loading and unloading purposes, independently of spindle motors which drive disks during reading and writing of information.

These known loading devices function appreciably well but still involve problems when considered from the view point of the current trend of development of disk-type information handling apparatus including reading/writing apparatus and related peripheral devices.

The first problem pertains to cost. Namely, the known loading device in general employs numerous parts or components such as the loading motor solely for loading and unloading, reduction gears, parts of a mechanism for lifting and lowering a cartridge holder and so forth. Thus, the cost of loading devices occupies a considerably large part of the cost of the whole information handling system.

The second problem pertains to size. The known loading device is composed of numerous parts or components, as pointed out above, and occupies a large space which undesirably increases the size of the whole apparatus.

It is highly desirable that the number and sizes of the parts or components of the disk loading device be reduced, considering that the number of parts will be further increased in disk-type information handling apparatus of the kind described to cope with future diversification of functions. The term "loading device" is used in this specification to mean a device which not only loads a disk cartridge but also unloads the same from the disk-type reading/writing apparatus, and is referred to also as a "reading/writing device" in this specification.

SUMMARY OF THE INVENTION

Accordingly, an object of the present invention is to provide a disk-type reading/writing apparatus having a small-sized and inexpensive disk loading device which is composed of a reduced number of parts and which has diversified functions.

According to the present invention, there is provided a disk apparatus, comprising: disk carrier means for carrying a disk as the information recording medium, being reciprocatively movable between a loading position and an unloading position; a motor for driving the disk at the loading position to enable reading or writing of information from or to the disk; power transmission means for converting rotation of the shaft of the motor into a reciprocative motion and transmitting the reciprocative motion to the disk carrier means, thereby transmitting torque of the motor to the disk carrier means; and switching means for switching the power transmission means to an inoperative state so as to prevent the torque from being transmitted from the motor to the disk carrier means when the motor is operating to rotate the disk for reading or writing purposes. The power transmission means may preferably include a rotary member rotatable with the shaft of the motor, at least one cam means movably secured to one of the disk carrier means and the rotary member, and cam engagement means provided on the other of the disk carrier means and the rotary member and engageable with the cam surface of the cam means. In a preferred embodiment of the invention, the cam means is provided on the disk carrier means and the cam engagement means is provided on the rotary member. However, the cam means may alternatively be provided on the rotary member and the cam engagement means on the disk carrier means.

The disk apparatus in accordance with the present invention has a disk loading mechanism which enables the motor, which rotationally drives the disk during reading or writing, to serve also as a loading motor which reciprocatively drives the disk between the loading and unloading positions. The present invention, therefore, eliminates the necessity for an expensive and space-occupying loading motor which is used in the conventional disk apparatus exclusively for loading and unloading purposes, as well as for reduction gears and other associated parts.

It is thus possible to provide an inexpensive and small-sized disk apparatus having superior performance.

A preferred embodiment of the present invention employs control means including first and second sensors for producing signals upon sensing arrival of the disk carrier means at the loading position and the unloading position, respectively, and a motor control circuit for controlling the operation of the motor. The motor control circuit, upon receipt of a signal from the first sensor, controls the motor to cause a low-speed operation of the motor which is converted by the power transmission means into a movement of the disk carrier means from the unloading position to the loading position. The control means, upon receipt of a signal from the second sensor, operate the motor at a high speed to rotate the disk for reading or writing of information. The switching means switches the power transmission means to the inoperative state so as to prevent the torque from being transmitted from the motor to the disk carrier means when the motor is operating at the high speed. When the reading or writing is completed, the motor control circuit causes a low-speed operation of the motor which is converted by the power transmission means into the movement of the disk carrier means from the loading position to the unloading position.

The above and other objects, features and advantages of the present invention will become clear from the following description with reference to the accompanying drawings.

DESCRIPTION OF THE PREFERRED EMBODIMENTS

A description will now be made of an optical disk reading/writing apparatus embodying the present invention.

Figure 1:
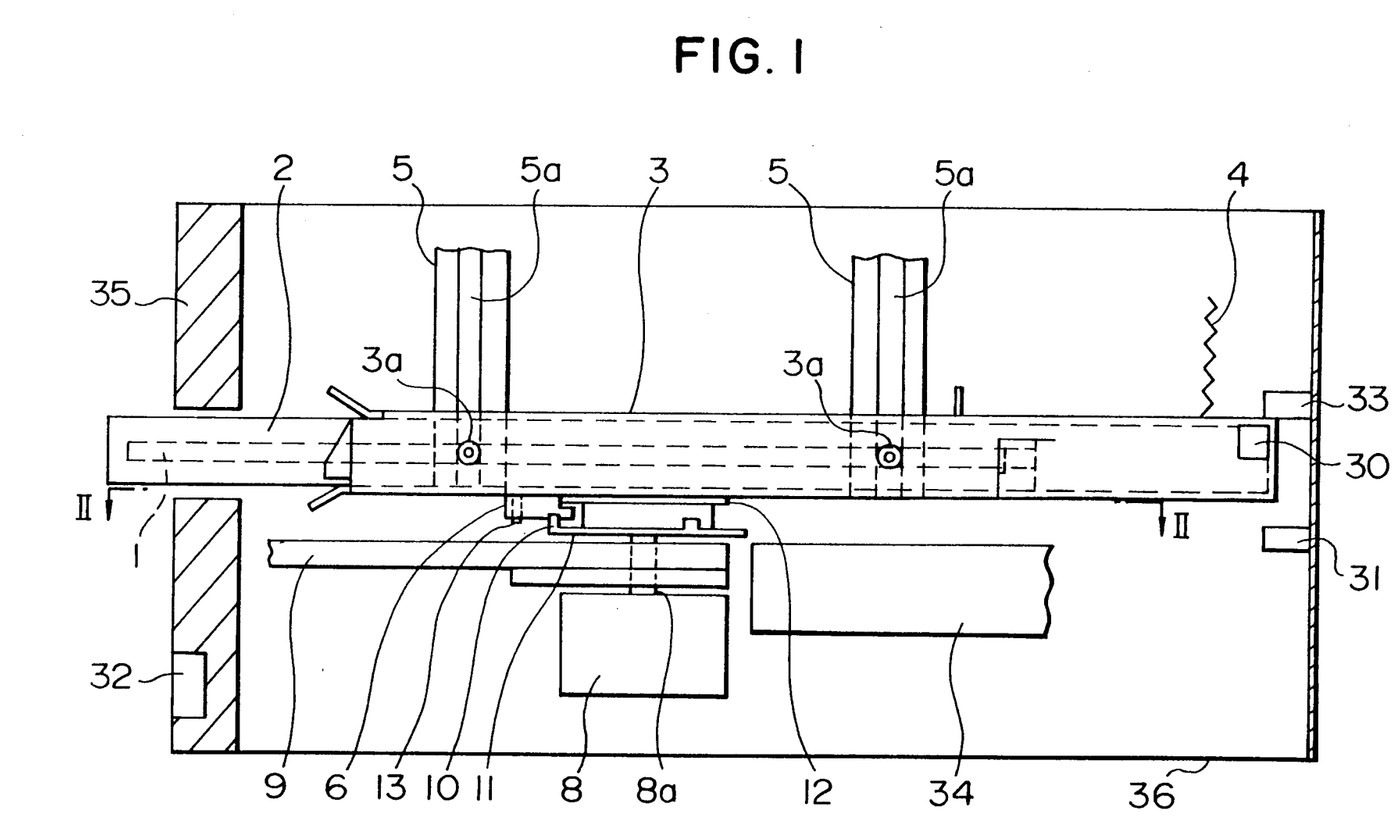
FIG. 1 is a schematic sectional side elevational view of an optical disk reading/writing apparatus embodying the present invention.
Figure 2:
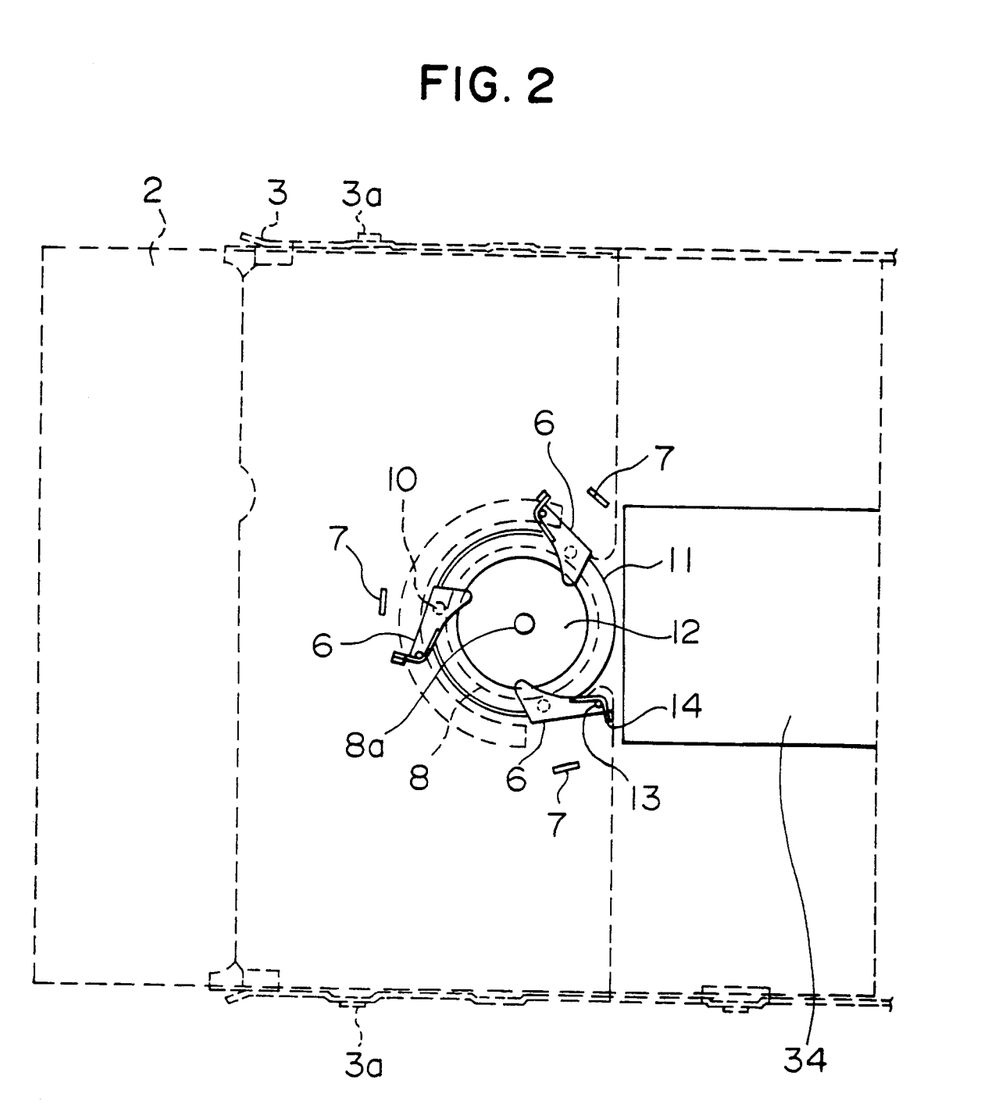
FIG. 2 is a plan view of a loading mechanism taken substantially along line II—II in FIG. 1.

Referring to FIGS. 1 and 2, the optical disk reading/writing apparatus, which will simply be referred to as a "disk apparatus", has a box-type housing 36 which accommodates various parts and components: namely, a cartridge 2 accommodating a disk 1 as a recording medium; a cartridge holder 3 which receives and holds the cartridge 2; springs 4 which normally bias the cartridge holder 3 downward; guides 5 having grooves 5a engaging with pins 3a provided on both sides of the cartridge holder 3 so as to guide the cartridge holder 3 during movement of the cartridge holder 3; a plurality of pivotable wedge-shaped levers 6 provided on the underside of the cartridge holder 3; a plurality of solenoids 7 provided on the underside of the cartridge holder 3 in correspondence with the wedge-shaped levers 6; a spindle motor 8 for rotationally driving the disk 1; a base 9 disposed in the housing 36 to hold the spindle motor 8; a rotary disk plate 11 rotatable with a shaft 8a of the spindle motor 8 and having a plurality of projections 10 on the surface thereof adjacent the cartridge holder 3; a hub 12 on the rotary disk plate 11; a sensor 30 capable of sensing insertion of the cartridge 2 into a predetermined position in the cartridge holder 3; sensors 31 and 33 for respectively sensing arrivals of the cartridge holder 3 at the lower and upper stroke ends thereof; and a head 34 which reads and writes information from and to the disk 1 in a manner known per se. An eject switch 32 is provided on a front panel 35 of the housing 36.

In this embodiment, three wedge-shaped levers 6 are provided on the undersurface of the cartridge holder 3 around the spindle motor 8, i.e., on a circle centered about the axis of the shaft 8a of the spindle motor 8, at a regular circumferential interval, and solenoids 7 are disposed on the radially outer sides of the respective levers 6. As will be seen from FIG. 3, each lever 6 is pivotally supported at its one end by a pin 13 which is provided on the undersurface of the cartridge holder 3. The other free end of the lever 6 can swing in the directions indicated by the double-headed arrow. The wedge-shaped lever 6 is urged by a spring 14 such that a curved side face 61 of the lever 6 is normally held in contact with a stopper 16 provided on the undersurface of the cartridge holder 3. The surface of the lever 6 adjacent the rotary disk plate 11 is provided with a groove 17 which has an inclined cam surface 17a continuous in the direction of length of the lever 6. As will be seen from FIGS. 4A and 4B, the depth of the groove 17 is greatest at its end adjacent the free end of the lever 6 and smallest a the end thereof near the pivoted end of the lever 6. As will be seen from FIG. 3, in this embodiment, the groove 17 terminates at a point which is inward of the curved side 61 of the lever 6.

Figure 3:
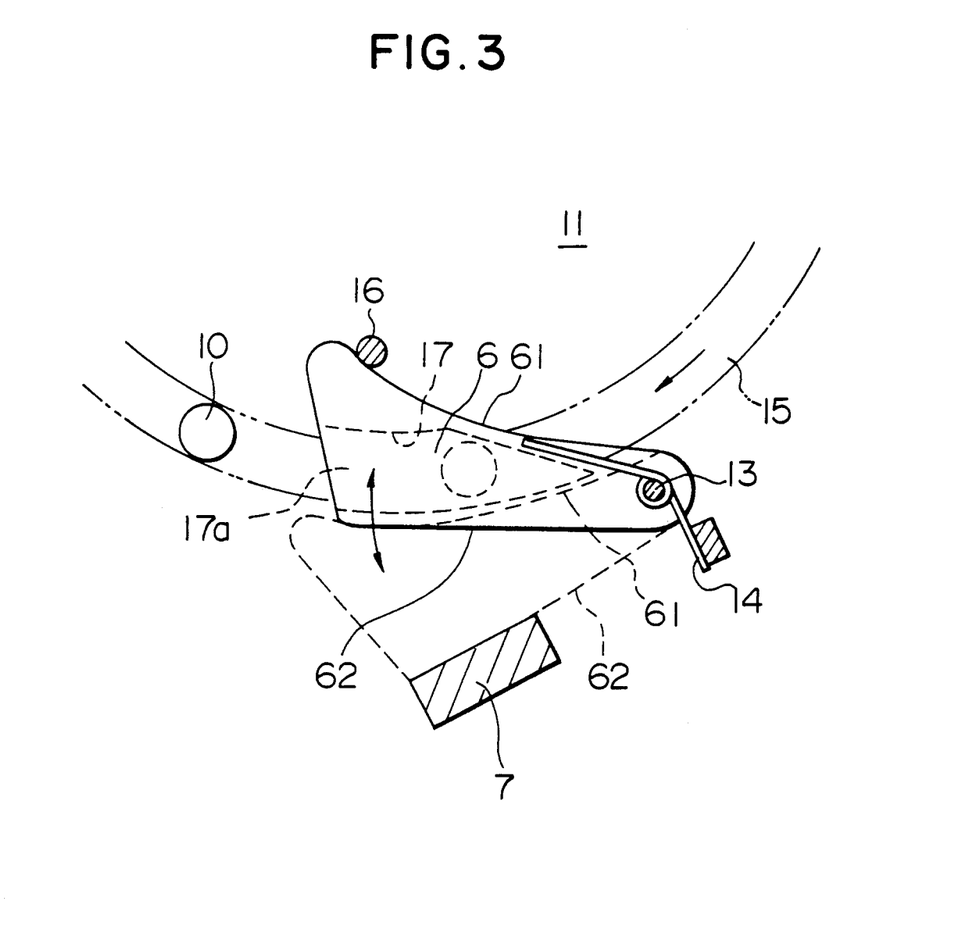
FIG. 3 is an enlarged plan view of a part of the loading mechanism shown in FIG. 2.

When the lever 6 is in the normal state shown by a solid line in FIG. 3, the lever 6 is urged inward by the force of the spring 14 so that the groove 17 is in alignment with an arcuate path 15 of the projections 10 on the disk plate 11 which rotates together with the shaft of the spindle motor 8. However, when the wedge lever 6 has been swung to a position where its straight side 62 contacts an associated solenoid 7, as shown by a broken line in FIG. 3, the groove 17 is radially outwardly offset from the path 15 of rotation of the projections 10.

The operation of the optical disk apparatus incorporating this disk loading mechanism will be described with reference to FIGS. 3 to 6.

Figure 5:
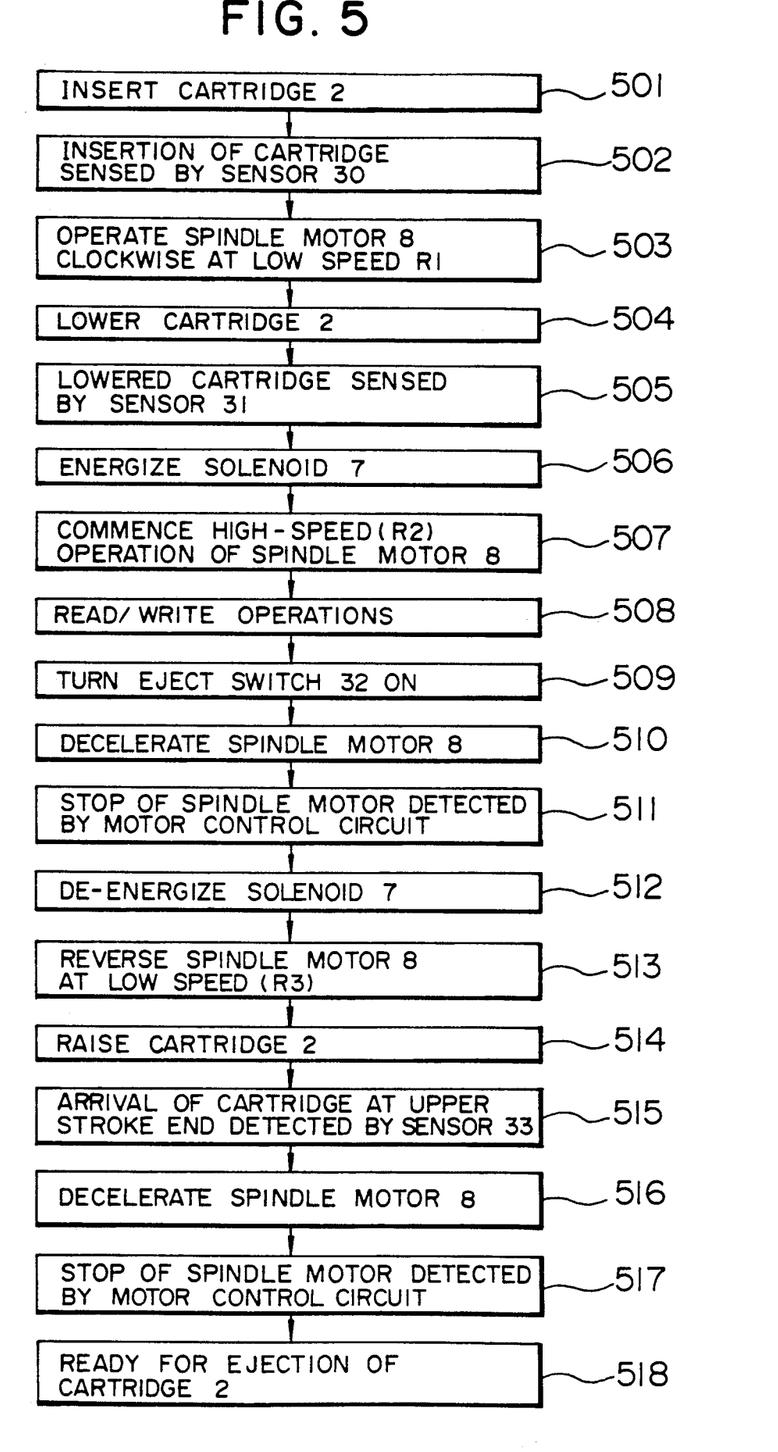
FIG. 5 is a flow chart showing the operation of the loading mechanism.
Figure 6:
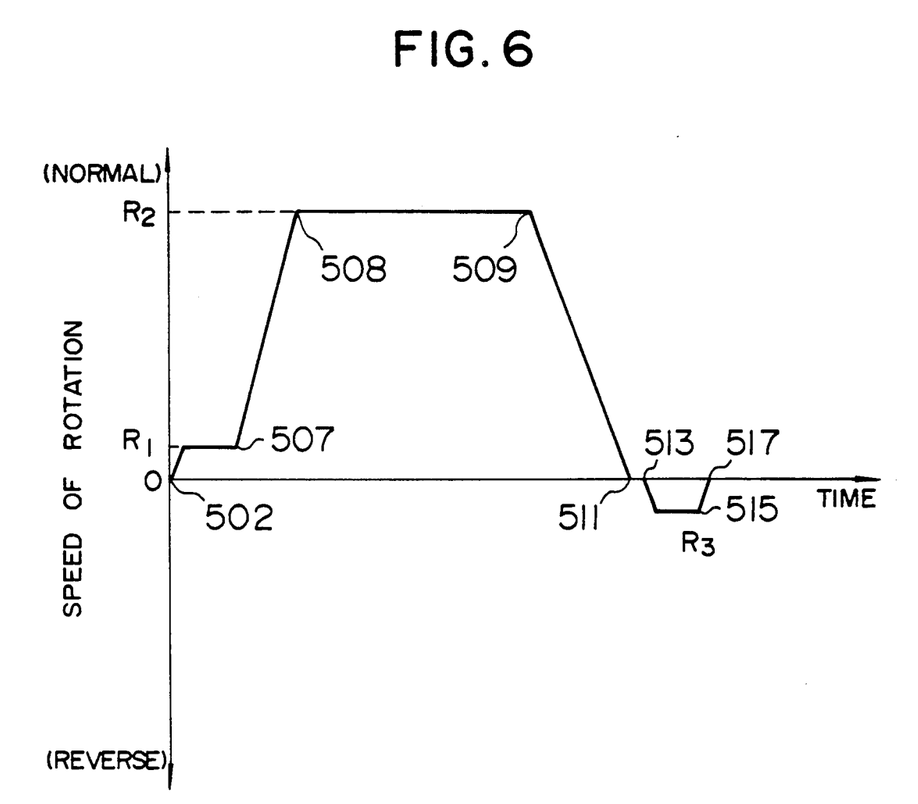
FIG. 6 is a diagram showing, in relation to the flow shown in FIG. 5, the manner in which the speed of operation of a spindle motor changes.

In the following description of operation, words appearing in brackets indicate the corresponding steps of the flow shown in FIG. 5.

A cartridge 2 accommodating a disk 1 is inserted into the cartridge holder 3 (Step 501). Full insertion of the cartridge 2 into the cartridge holder 3 is sensed by the sensor 30 (Step 502). The sensor 30, upon sensing the full insertion of the cartridge 2, produces a signal which serves to start the spindle motor 8 so that the spindle motor 8 commences to operate clockwise as viewed in FIGS. 3 and 4 at a low speed (R1) (Step 503). Meanwhile, the cartridge holder 3 is urged by the springs 4 downward as viewed in FIG. 1.

The rotation of the shaft of the spindle motor 8 causes rotation of the rotary disk plate 11 fixed thereto. Consequently, as will be best seen from FIG. 4A, a relative motion is caused between a projection 10 on the rotary disk plate 11 and a lever 6 so that the projection 10 starts to slide along the inclined cam surface 17a from the shallowest end (right-hand end in FIG. 3) towards the free end of the lever 6. As a result, the projection 10 leaves the lever 6 so that the cartridge holder 3 is allowed to be lowered to the lower stroke end thereof along the guides 5 (Step 504).

Arrival of the cartridge holder 3 to the lower stroke end is sensed by the sensor 31 (Step 505). The sensor 31 then produces a signal which serves to turn the solenoid 7 on (Step 506). At the same time, the speed of the spindle motor 8 is changed to a high speed (R2) (Step 507). At the beginning of the high-speed operation of the spindle motor 8, the projection 10 collides with the curved side surface 61 of a succeeding lever (referred to as the "second lever") which is next to the above-mentioned lever 6 as viewed in the direction of rotation of the rotary disk plate 11, as shown at Position II in FIG. 4, so that the second lever 6 is swung about the pivot pin 13 against the force of the spring 14 to the outer side of the path 15 of movement of the projection 10. As a consequence, the second lever 6 is brought close to an associated solenoid 7 which has been energized, so that the second lever 6 is attracted by the solenoid 7, whereby the lever 6 is held at a position outside the path 15 of movement of the projections 10, i.e., at the position shown by the solid line at Position II in FIG. 4. Consequently, the spindle motor 8 is allowed to rotate without any hindrance so that the disk 1 is continuously rotated for reading or writing of information by the head 34 (Step 508). During the reading or writing, the cartridge holder 3 is fixed to the base, while the disk 1 is fixed to the hub 12 of the spindle motor 8.

Then, when an eject switch 32 is turned on (Step 509), the spindle motor 8 which is operating at the high speed is decelerated (Step 510) and the stopped. The state of the spindle motor 8 immediately before or after the stoppage is detected by a later-mentioned motor control circuit (Step 511) which produces a signal for de-energizing the solenoid 7 (Step 512), thereby releasing the lever 6, whereby the lever 6 is rotated by the force of the spring 14 to a position where it overlaps the path 15 of movement of the projections 10, i.e., to the position shown by the solid line at Position III in FIG. 4.

After elapse of a short time period from the stoppage of the spindle motor 8, the spindle motor 8 starts to reverse at a low speed (R3) (Step 503). Consequently, as will be best seen from FIG. 4B, a projection 10 slides into the groove 17 in a lever 6 which is the first one as viewed from the projection 10 in the direction of reversed rotation of the rotary disk plate 11. The projection 10 then engages with the inclined cam surface 17a to slide along this inclined cam surface 17a, thereby lifting the lever 6 and, hence, the cartridge holder 3 (Step 514).

Figure 4:
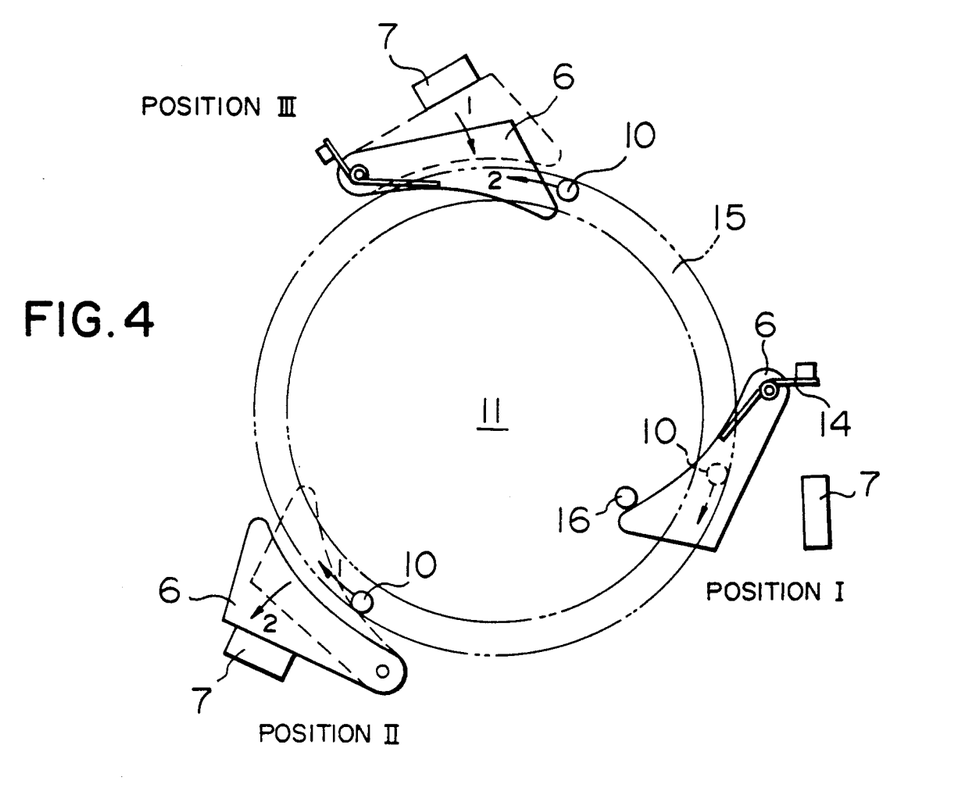
FIG. 4 is a plan view of a part of the loading device, showing particularly the relationship between wedge-shaped levers and cooperating projections on a rotary disk plate in three different states of operation of the loading mechanism.
Figure 4A:
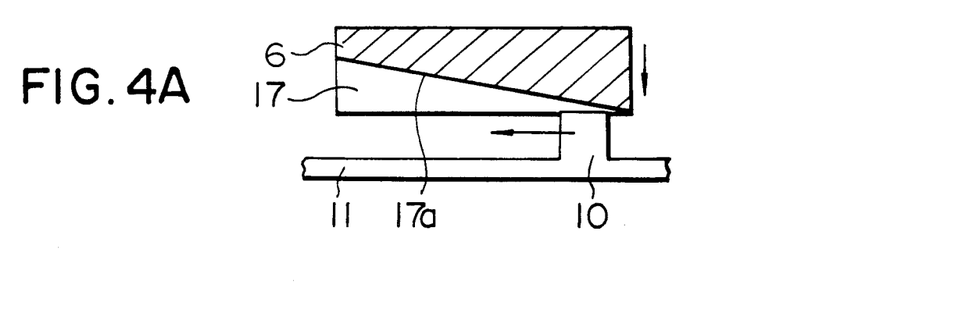
FIGS. 4A and 4B are respectively partly-sectioned side elevational views of the wedge-shaped levers and the rotary disk plate in positions I and III shown in FIG. 4.
Figure 4B:
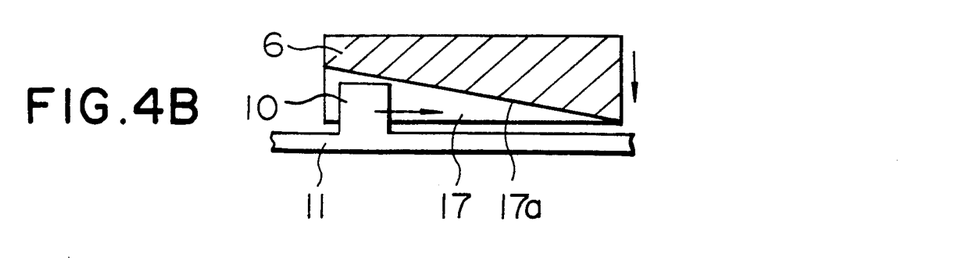

Arrival of the cartridge holder 3 at its upper stroke end is sensed by the sensor 33 (Step 515). The sensor 33 produces a signal which serves to decelerate the spindle motor 8 (Step 516). Stoppage of the spindle motor 8 is detected by the motor control circuit (Step 517), making the cartridge holder 3 ready to eject the cartridge 2 (Step 518). In this state, the projection 10 has been returned to the shallowest end of the groove 17 in the lever 6 as at Position I in FIG. 4 and as shown in FIG. 4A.

A second embodiment of the present invention will be described with reference to FIGS. 7, 8, 9 and 10.

Illustration and description are omitted for the features of the second embodiment common to the first embodiment. Step numbers appearing in brackets are those in a flow chart shown in FIG. 9.

In contrast to the first embodiment in which the spindle motor is reversed in a later part of the series of operation, the second embodiment can complete its operation without requiring reversing of the spindle motor as will be understood from the following description.

The second embodiment also employs a rotary disk plate 11 which is fixed to the shaft 8a of the spindle motor 8 for rotation as a unit therewith. A plurality of projections 110 are provided on the surface of a rotary disk plate 11 adjacent the cartridge holder 3. These projections 110 are arranged on a first circle centered about the axis of the shaft 8a of the spindle motor 8 at a regular circumferential interval. A plurality of first levers 37 are provided on the undersurface of the cartridge holder 3, i.e., on the surface of the cartridge holder 3 adjacent the spindle motor 8. These first levers 37 are arranged on a second circle centered about the axis of the shaft 8a at a regular interval. Each first lever 37 is pivoted at its on end by a shaft 113. A second lever 38 is pivotally connected through a pin 40 to the free end of each first lever 37. Solenoids 107 for cooperating with respective first levers 37 are fixed to the undersurface of the cartridge holder 3 at positions near the associated first levers 37.

Figure 7:
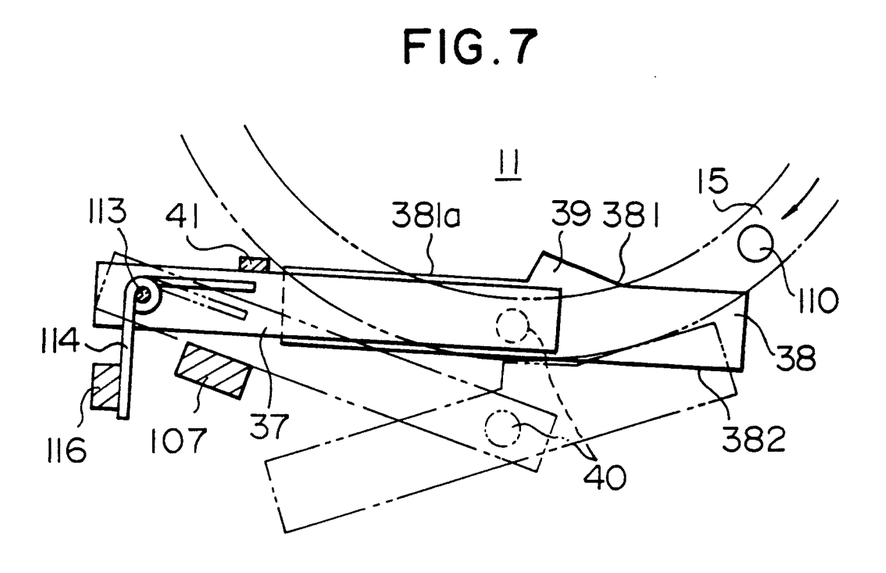
FIG. 7 is an enlarged plan view of a part of a loading mechanism incorporated in a second embodiment of the disk reading/writing apparatus of the present invention.
Figure 8:
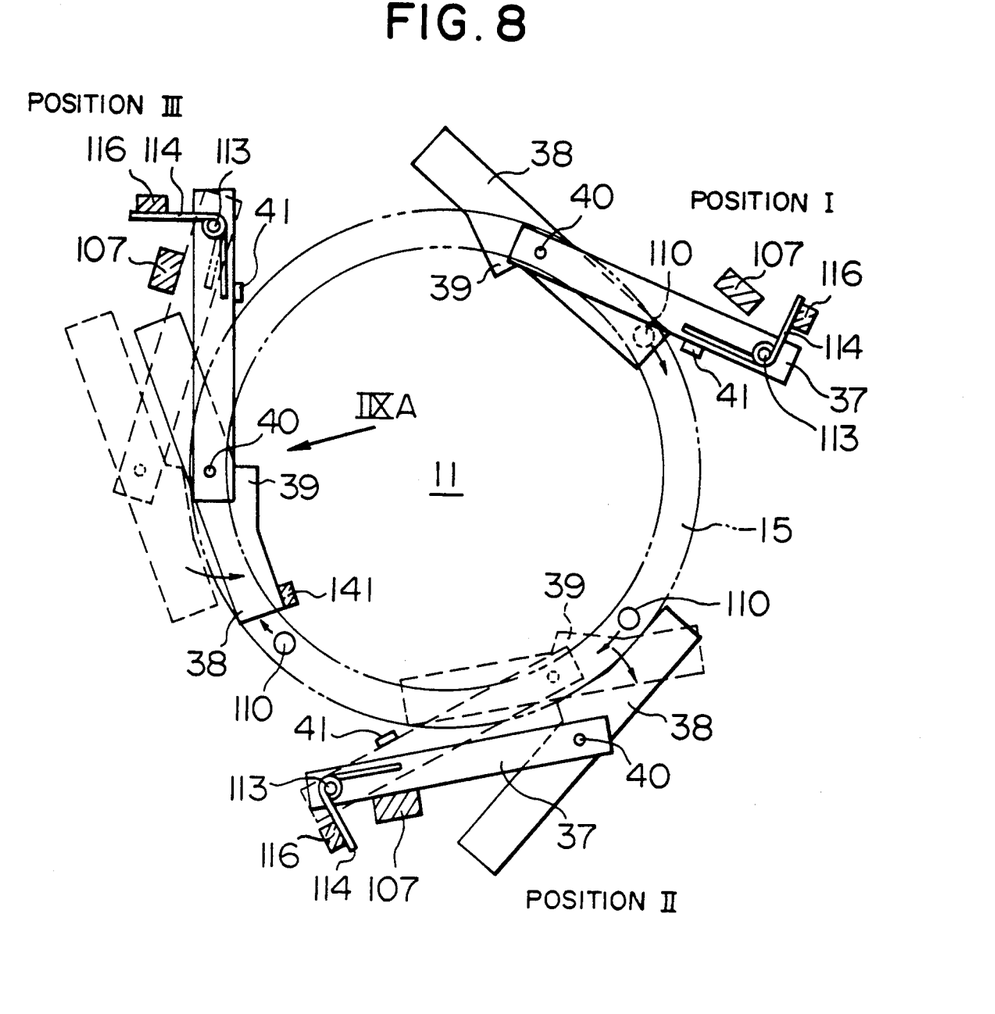
FIG. 8 is a plan view of a part of the second embodiment illustrating three different states of operation of the loading mechanism, similarly to FIG. 4 which shows the first embodiment.
Figure 8A:
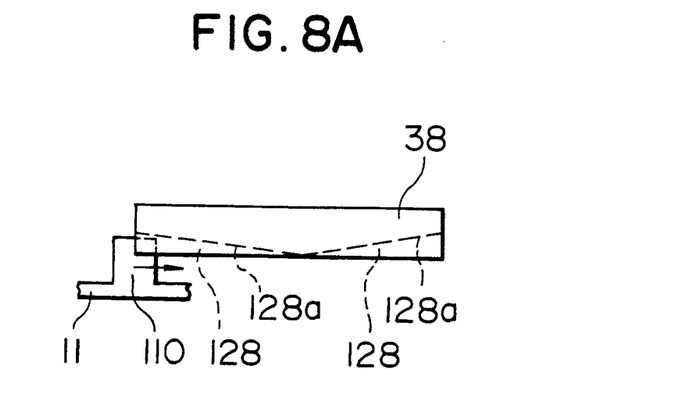
FIG. 8A is a side elevational view of the loading mechanism as viewed in the direction of an arrow IIXA in FIG. 8.
Figure 9:
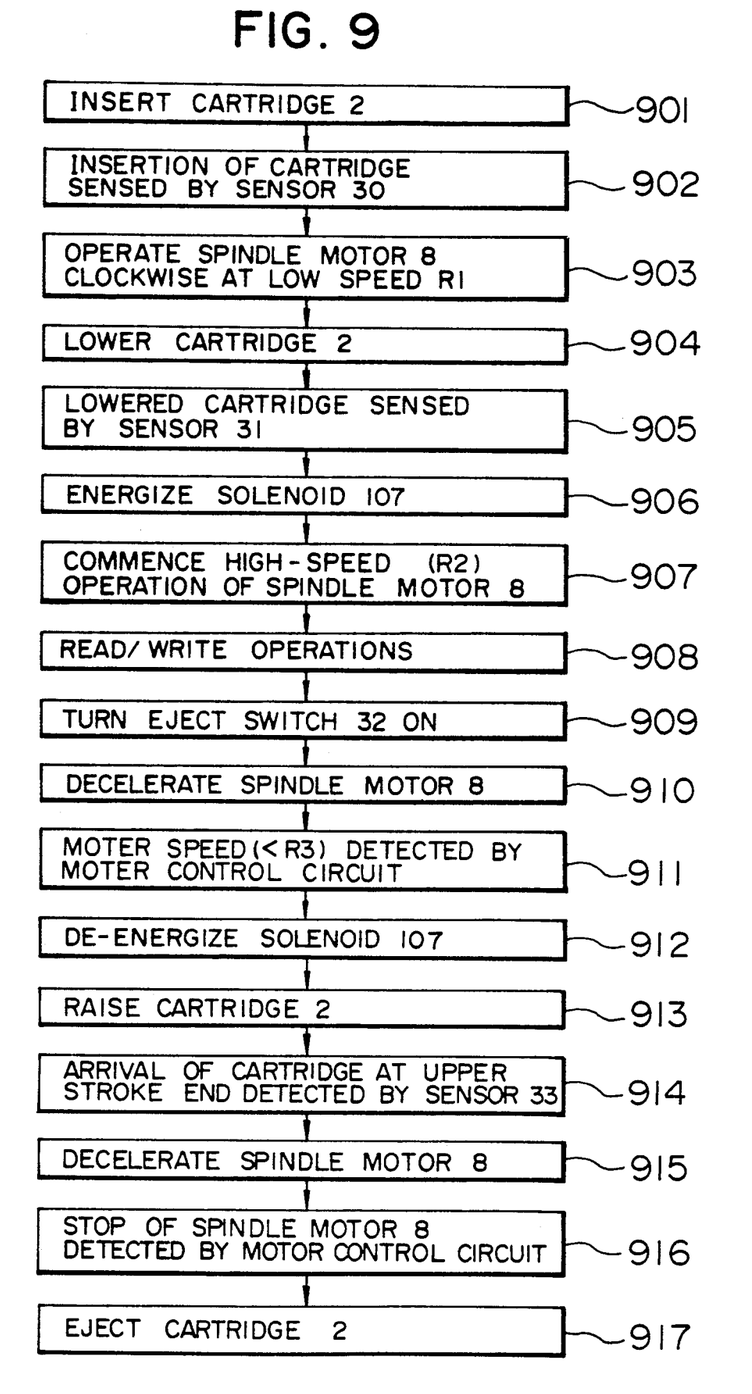
FIG. 9 is a flow chart showing the operation of the loading device of the second embodiment.
Figure 10:
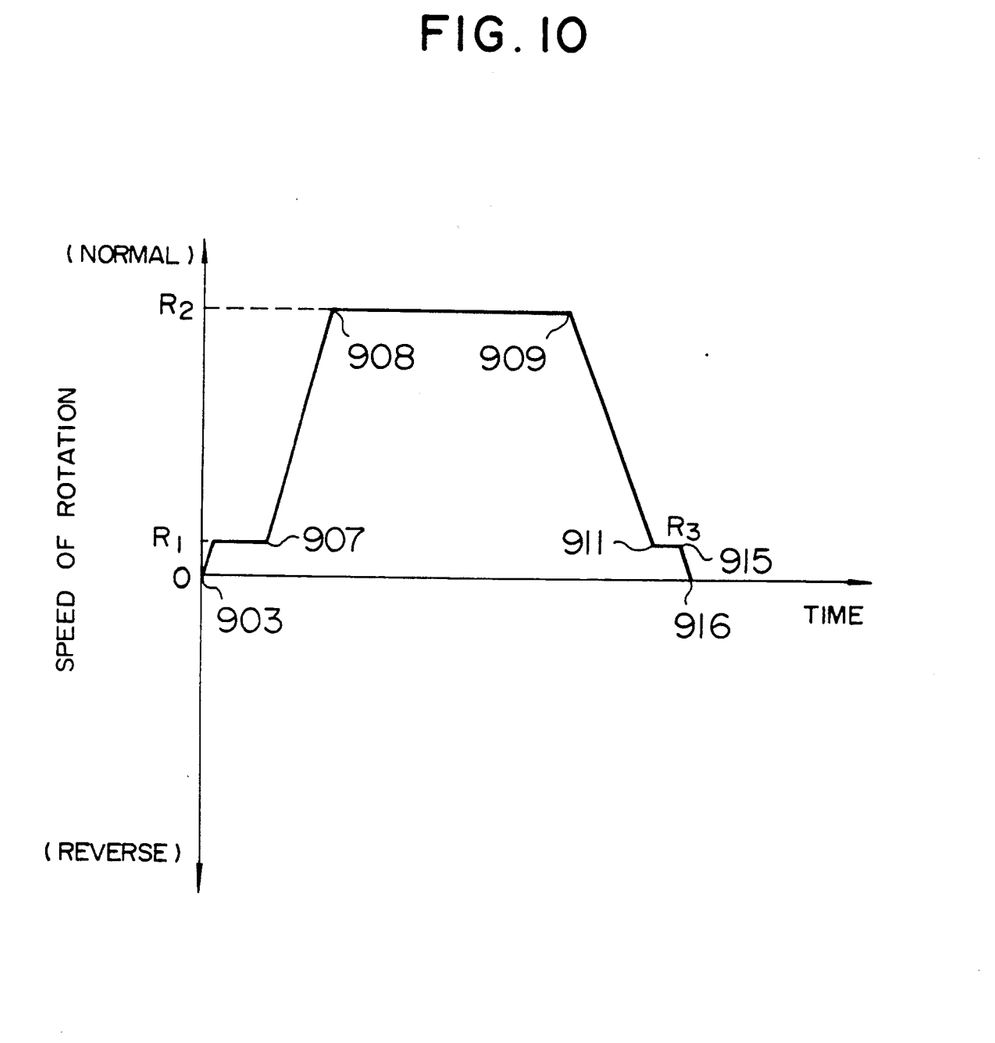
FIG. 10 is a diagram similar to that in FIG. 6 but shows the manner of change in the operation speed of a spindle motor of the second embodiment.

Each first lever 37 is biased by a spring 114 counterclockwise as viewed in FIGS. 7 and 8 such that its free end is moved towards the path 15 of rotation of the projections 110. This motion of the first lever 37 is stopped by a stopper 41. Each second lever 38 is provided on its one side surface 381 with a triangular projection 39. A groove 128 having two consecutive inclined surfaces 128a is provided in the undersurface of the second lever 38 so as to extend in the longitudinal direction of the second lever 38. More specifically, as will be seen from FIG. 8A, the depth of the groove 128 is smallest at a substantially mid portion of the groove 128 and linearly decreases towards both longitudinal ends of the groove 128.

The operation of the second embodiment is as follows: The spindle motor 8 is not in operation in the initial state. In this state, each projection 110 is in engagement with the substantially mid portion of the groove 128 where the depth of the groove 128 is the smallest, so that the cartridge holder 3 is at its upper stroke end. A cartridge 2 is inserted into the cartridge holder 3 held at the upper stroke end (step 901). Insertion of the cartridge 2 to a predetermined position in the cartridge holder 3 is sensed by the sensor 30 (Step 901), so that the sensor 30 produces a signal which serves to trigger an operation of the spindle motor 8 so that the shaft 8a of the spindle motor starts to rotate clockwise as viewed in FIG. 8 at a low speed (R1) (Step 903). In this state, the cartridge holder 3 is urged downwards by the springs 14 shown in FIG. 1. The rotary disk plate 11 starts its rotation as the spindle motor 8 is started. As a consequence, the projection 110 on the disk plate 11 leaves the second lever 38 to allow the cartridge holder 3 to be lowered to the lower stroke end by the force of the springs 14 (Step 904).

Arrival of the cartridge holder 3 a the lower stroke end is sensed by the sensor 31 (Step 905), so that the sensor 31 produces a signal which serves to turn the solenoid 7 on (Step 906). At the same time, the speed of rotation of the shaft 8a of the spindle motor 8 is elevated to a high speed (R2) (Step 907). At the beginning of the high-speed operation of the spindle motor 8, the projection 110 collides with the triangular projection 39 on the side surface 381 of a succeeding lever 38 which is the next one, as viewed in the direction of rotation of the disk plate 11, thereby pressing this lever 38 at the side surface 381 thereof. As a consequence, this second lever 38 is made to rotate outward together with the associated first lever 37 about the pivot pin 113. More specifically, the projection 110 is allowed to slide on the triangular projection 39 to leave the side surface 381 of the second lever 38 so that the pair of levers 37 and 38 are made to rotate about the pivot pin 113 from the broken-line position to the solid-line position at Position II in FIG. 8, with the second lever 38 slightly swung counterclockwise relative to the first lever 37 about the pin 40. As a result of this motion of the levers 37 and 38, the first lever 37 approaches the solenoid 107 which has been energized as described before, so that the first lever 37 is attracted by the solenoid 107, whereby the first and second levers are held apart from the path 15 of movement of the projections 110, as shown by the solid line at Position II in FIG. 8. Consequently, the spindle motor 8 is allowed to rotate without hindrance so that the disk 1 is rotated continuously for reading or writing of information by the head 34 (Step 908).

It is preferred to provide suitable means for holding the lever 38 at Position II in FIG. 8 during high-speed operation of the spindle motor 8 thereby preventing accidental rotation of the lever 38 about the pin 40 into the path 15 of rotation of the projections 110. For instance, a stopper (not shown) may be provided for limiting the range of pivotal motion of the lever 38 relative to the lever 37 about the pin 40, or resistance means may be provided to resist any force which tends to rotate the lever 37 about the pin 40.

When the eject switch 32 is turned on (Step 909), the spindle motor 8 is decelerated (Step 910). Reduction of the rotational speed of the spindle motor shaft 8a down to a predetermined low speed (R3) or lower than that is sensed by the motor control circuit (Step 911) which produces a signal to de-energize the solenoid 107 (Step 912). Consequently, the first lever 37 is released from the solenoid 107 so that the levers 37 and 38 are swung by the force of the spring 114 to the position shown by the solid line at Position III in FIG. 8 from the position outside the path 15 of movement of the projections 110, i.e., from the position shown by the solid line at Position II in FIG. 8, which is the position shown by the broken line at Position III of the same FIGURE. Consequently, the projection 110 slides into the lower side of the next second lever 38 into engagement with the groove 128 in this lever 38 to slide along the inclined cam surface 128a of the groove 128 while lifting this second lever 38, whereby the cartridge holder 3 is lifted (Step 913). In order to assure that the projection 110 slides into the groove 128 in the lever 38 held in the solid-line position at Position III, a stopper 141 for limiting the rotation of the second lever 38 caused by the force of the spring 114 may be provided on the undersurface of the cartridge holder 3.

The sensor 33 senses the arrival of the cartridge holder 3 at its upper stroke end (Step 914), produces a signal which serves to decelerate the spindle motor 8 (Step 915). Stoppage of the spindle motor 8 is detected by the motor control circuit (Step 916), whereby the cartridge holder 3 is prepared to eject the cartridge 2 (Step 518).

The second embodiment as described offers advantages over the first embodiment in that quicker unloading operation can be performed due to elimination of stoppage and reversing of the operation of the spindle motor and in that an inexpensive motor which operates only in one direction can be used as the spindle motor.

Figure 11:
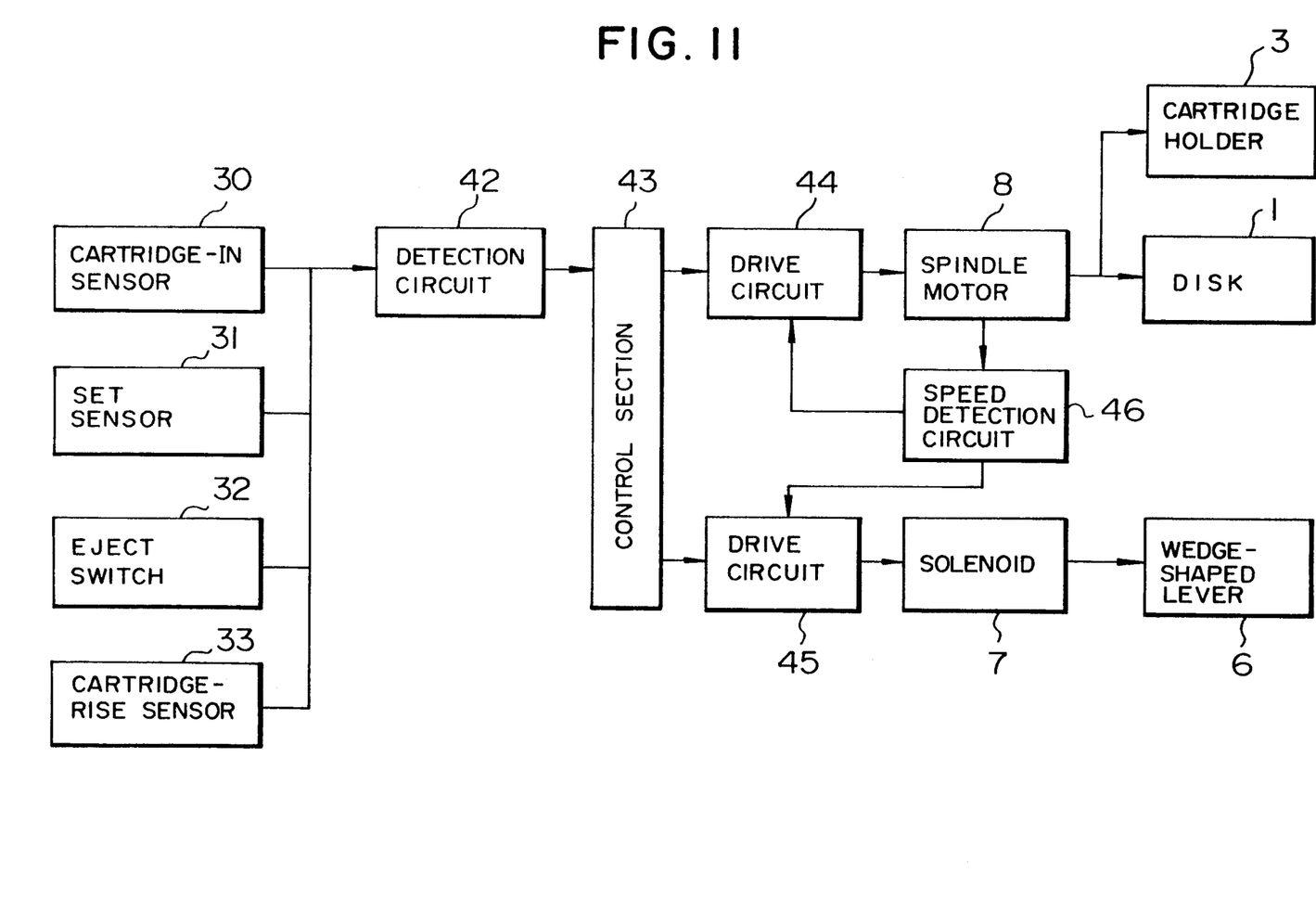
FIG. 11 is a block diagram of a control circuit.

FIG. 11 is a block diagram of an example of the control circuit system usable in each of the described embodiments.

Referring to this FIGURE, a detection circuit 42 detects, through operation of the sensor 30, full insertion of the cartridge 2 into the cartridge holder 3. Upon receipt of a signal indicative of the full insertion of the cartridge 2 delivered by the detection circuit 42, a control section 43 controls a drive circuit 44 so as to operate the spindle motor 8 at low speed, thus enabling the cartridge holder 3 to be lowered.

Subsequently, the detection circuit 42 detects, through the operation of the sensor 31, that the cartridge 2 has been set in the loading position. In response to a signal indicative of the setting of the cartridge 2 delivered from the detection circuit 42, the control section 43 operates the drive circuit 45 so as to energize the solenoid 7. At the same time, the control section 43 operates the drive circuit 44 to enable the latter to drive the spindle motor at the elevated speed.

Actuation of the eject switch 32 by the operator after completion of reading or writing is detected by the detection circuit 42 so that the control section 43 operates the drive circuit 44 to stop the spindle motor 8, whereby the spindle motor 8 is decelerated and stopped. Upon detection of the stoppage of the spindle motor 8, a speed detection circuit 46 produces a signal which serves to operate the drive circuit 45 so as to de-energize the solenoid 7, while activating the drive circuit 44 to cause the spindle motor 8 to operate at the low speed. This low-speed operation of the spindle motor takes place in the reverse direction in the first embodiment. Consequently, the cartridge holder 3 is raised in the manner described before.

Lifting of the cartridge to the upper stroke end is detected, through the operation of the sensor 33, by the detection circuit 42 which delivers a signal to the control section 43. The control section 43 then controls the drive circuit 44 so as to stop the spindle motor 8.

What is claimed is:

1. A disk apparatus, comprising:
    disk carrier means for carrying a disk as an information recording medium, said disk carrier means being reciprocatively movable between a loading position and an unloading position;
    a motor for driving said disk at said loading position for reading or writing of information from or into said disk;
    power transmission means for converting rotation of a shaft of said motor into a reciprocative motion and transmitting the reciprocative motion to said disk carrier means, thereby transmitting power of said motor to said disk carrier means; and
    switching means for switching said power transmission means to an inoperative state so as to prevent the power of the motor from being transmitted from said motor to said disk carrier means when said motor is operating to rotate said disk for reading or writing purpose.

2. A disk apparatus according to claim 1, wherein said power transmission means includes a rotary member rotatable together with the shaft of said motor and at least one cam means movably secured to one of said disk carrier means and said rotary member, said cam means having a cam surface comprising at least one surface inclined with respect to a plane normal to the axis of said shaft of said motor, said power transmission means further including cam engagement means provided on the other of said disk carrier means and said rotary member and engageable with said cam surface of said cam means.

3. A disk apparatus according to claim 2, wherein said cam engagement means includes a cam operation member provided on said rotary member, said cam means being pivotally secured to said disk carrier means for pivotal movement between a first position in which said cam means is aligned with a circular path of movement of said cam operation member caused by the operation of said motor and a second position in which said cam means is out of said circular path, and wherein said switching means includes cam holding means for holding said cam means in said second position.

4. A disk apparatus according to claim 3, wherein said cam holding means includes a solenoid and said switching means includes biasing means for always biasing said cam means towards said first position and driving means for driving said cam means towards said second position against the effect of said biasing means, said switching means further including means for electrically energizing said solenoid in advance of the driving of said cam means to said second position thereby enabling said solenoid to magnetically attract and hold said cam means in said second position.

5. A disk apparatus according to claim 4, wherein said biasing means includes a spring and said driving means includes an additional cam surface formed on said cam means, said additional cam surface being positioned on said circular path at an angle to a line tangent to said circular path when said cam means is in said first position, so as to be engaged by said cam operation member thereby causing said cam means to be driven to said second position.

6. A disk apparatus according to claim 5, wherein said at least one cam means includes a wedge-shaped lever pivotally mounted on said disk carrier means, said additional cam surface comprising one side surface of said wedge-shaped lever, said inclined surface forming said cam surface comprising a bottom surface of a groove formed in the surface of said wedge-shaped lever facing said rotary member, the depth of said groove being progressively and substantially linearly varying from one end towards the other end of said groove, whereby said disk carrier means is moved from said unloading position to said loading position and vice versa depending on the direction of rotation of said shaft of said motor.

7. A disk apparatus according to claim 5, wherein said at least one cam means includes a first lever pivotally connected at its one end to said disk carrier means and a second lever having one end pivotally connected to the other end of said first lever, said second lever being provided in its surface facing said rotary member with two consecutive grooves extending substantially in the longitudinal direction of said second lever, said two consecutive grooves being formed to merge each other substantially at the lengthwise mid portion of said second lever so as to increase their depths towards opposite longitudinal ends of said second lever thereby to present two consecutive inclined cam surfaces, whereby said disk carrier means is moved from said unloading position to said loading position and vice verse by a uni-directional operation of said motor.

8. A disk apparatus, comprising:
disk carrier means for carrying a disk as an information recording medium, said disk carrier means being reciprocatively movable between a loading position and an unloading position;
a motor for driving said disk at said loading position for reading or writing of information from or into said disk;
power transmission means for converting rotation of a shaft of said motor into a reciprocative motion and transmitting the reciprocative motion to said disk carrier means, thereby transmitting power of said motor to said disk carrier means;
control means including first and second sensors for producing signals upon sensing arrivals of said disk carrier means at said loading position and said unloading position, respectively, and a motor control circuit for controlling the operation of said motor;
said motor control circuit, upon receipt of a signal from said first sensor, controlling said motor to cause a low-speed operation of said motor which is converted by said power transmission means into movement of said disk carrier means from said unloading position to said loading position;
said control means, upon receipt of a signal from said sensor, operating said motor at a high speed to cause said disk to rotate for reading or writing of information;
means for switching said power transmission means to an inoperative state so as to prevent the power of the motor from being transmitted from said motor to said disk carrier means when said motor is operating at said high speed;
said motor control circuit, when the reading or writing is completed, causing said motor to rotate at said low speed, the low-speed rotation being converted by said power transmission means into a movement of said disk carrier means from said loading position to said unloading position.

9. A disk apparatus according to claim 8, wherein said power transmission means includes a rotary member rotatable together with the shaft of said motor and at least one cam means movably mounted on one of said disk carrier means and said rotary member, said cam means having a cam surface comprising at least on surface inclined with respect to a plane normal to the axis of said shaft of said motor, said power transmission means further including cam engagement means provided on the other of said disk carrier means and said rotary member and engageable with said cam surface of said cam means.

10. A disk apparatus according to claim 9, wherein said cam engagement means includes a cam operation member provided on said rotary member, said cam means being pivotally mounted on said disk carrier means for pivotal movement between a first position in which said cam means is aligned with a circular path of movement of said cam operation member caused by the operation of said motor and a second position in which said cam means is out of said circular path, and wherein said switching means includes cam holding means for holding said cam means in said second position.

11. A disk apparatus according to claim 10, wherein said cam holding means includes a solenoid controlled by said control means and said switching means includes biasing means for always biasing said cam means towards said first position and driving means for driving said cam means towards said second position against the effect of said biasing means, said control means, upon receipt of said signal from said second sensor, electrically energizing said solenoid thereby enabling said solenoid to magnetically attract and hold said cam means in said second position.

12. A disk apparatus according to claim 11, wherein said biasing means includes a spring and said driving means includes an additional cam surface formed on said cam means, said additional cam surface being positioned on said circular path at an angle to a line tangent to said circular path when said cam means is in said first position, so as to be engaged by said cam operation member thereby causing said cam means to be driven to said second position.

13. A disk apparatus according to claim 12, wherein said at least one cam means includes a wedge-shaped lever pivotally mounted on s id disk carrier means, said additional cam surface comprising one side surface of said wedge-shaped lever, said inclined surface forming said cam surface comprising a bottom surface of a groove formed in the surface of said wedge shaped lever facing said rotary member, the depth of said groove being progressively and substantially linearly varying from one end towards the other end of said groove, said control means controlling said motor control circuit so as to operate said motor in one and the other directions for causing the movement of said disk carrier means from said unloading position to said loading position and vice versa in accordance with signals from said sensors.

14. A disk apparatus according to claim 12, wherein said at least one cam means includes a first lever pivotally connected at its one end to said disk carrier means and a second lever having one end pivotally connected to the other end of said first lever, said second lever being provided in its surface facing said rotary member with two consecutive grooves extending substantially in the longitudinal direction of said second lever, said two consecutive grooves being formed to merge each other substantially at the lengthwise mid portion of said second lever so as to increase their depths towards opposite longitudinal ends of said second lever thereby to present two consecutive inclined cam surfaces, whereby said disk carrier means is moved from said unloading position to said loading position and vice versa by a uni-directional operation of said motor.

* * * * *